(12) United States Patent
Natanzon et al.

(10) Patent No.: US 11,301,418 B2
(45) Date of Patent: Apr. 12, 2022

(54) METHOD AND SYSTEM FOR PROVENANCE-BASED DATA BACKUPS

(71) Applicant: EMC IP Holding Company LLC, Hopkinton, MA (US)

(72) Inventors: Assaf Natanzon, Tel-Aviv (IL); David Zlotnick, Tel-Aviv (IL); Boris Shpilyuck, Ashdod (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 405 days.

(21) Appl. No.: 16/402,196

(22) Filed: May 2, 2019

(65) Prior Publication Data

US 2020/0349109 A1 Nov. 5, 2020

(51) Int. Cl.
*G06F 16/11* (2019.01)
*G06F 9/38* (2018.01)
*G06F 11/14* (2006.01)

(52) U.S. Cl.
CPC .......... *G06F 16/122* (2019.01); *G06F 9/3869* (2013.01); *G06F 11/1448* (2013.01); *G06F 11/1464* (2013.01)

(58) Field of Classification Search
CPC .. G06F 16/122; G06F 9/3869; G06F 11/1448; G06F 11/1464
See application file for complete search history.

(56) References Cited

U.S. PATENT DOCUMENTS

| | | | |
|---|---|---|---|
| 7,752,463 B2 * | 7/2010 | Hahn | G06F 21/6209 713/193 |
| 9,495,207 B1 * | 11/2016 | Pjesivac-Grbovic | ... G06F 9/544 |
| 10,127,119 B1 * | 11/2018 | Paulzagade | G06F 11/1471 |
| 10,318,180 B1 * | 6/2019 | Benhanokh | G06F 12/0246 |
| 2007/0083575 A1 * | 4/2007 | Leung | G06F 16/122 |
| 2010/0306228 A1 * | 12/2010 | Carpenter | G06F 16/3322 707/765 |
| 2011/0238621 A1 * | 9/2011 | Agrawal | G06F 16/273 707/610 |
| 2013/0227051 A1 * | 8/2013 | Khakpour | G06F 16/9574 709/213 |
| 2014/0095472 A1 * | 4/2014 | Lee | G06F 16/24542 707/718 |
| 2016/0259571 A1 * | 9/2016 | Kumasawa | G06F 3/0619 |
| 2017/0212915 A1 * | 7/2017 | Borate | G06F 16/125 |
| 2018/0060348 A1 * | 3/2018 | Power | G06F 16/137 |
| 2018/0295204 A1 * | 10/2018 | Westphal | H04L 45/124 |
| 2018/0349425 A1 * | 12/2018 | Hazel | G06F 16/83 |
| 2018/0356989 A1 * | 12/2018 | Meister | G06F 11/3409 |
| 2019/0056931 A1 * | 2/2019 | Ding | G06F 8/71 |
| 2019/0340185 A1 * | 11/2019 | Seela | G06F 16/2282 |
| 2019/0354398 A1 * | 11/2019 | Aggarwal | G06F 9/5027 |
| 2019/0354628 A1 * | 11/2019 | Grunwald | G06F 3/067 |
| 2019/0356609 A1 * | 11/2019 | Grunwald | G06F 16/275 |
| 2020/0142622 A1 * | 5/2020 | Bode | G06F 3/0641 |

(Continued)

*Primary Examiner* — Usmaan Saeed
*Assistant Examiner* — David M Nafziger
(74) *Attorney, Agent, or Firm* — Chamberlain, Hrdlicka, White, Williams & Aughtry

(57) ABSTRACT

A method and system for provenance-based data backups. Specifically, the method and system disclosed herein entail generating and, subsequently, using data provenance to filter which collections of data, produced through the data mining of big data, should be replicated and stored in backup storage.

14 Claims, 6 Drawing Sheets

(56) References Cited

U.S. PATENT DOCUMENTS

| | | | |
|---|---|---|---|
| 2020/0142634 A1* | 5/2020 | Surcouf | H03M 13/154 |
| 2020/0201908 A1* | 6/2020 | Ma | G06F 16/325 |
| 2020/0225868 A1* | 7/2020 | Dalmatov | G06F 12/0897 |
| 2021/0167944 A1* | 6/2021 | Kalistru | G06F 5/10 |

* cited by examiner

METHOD AND SYSTEM FOR PROVENANCE-BASED DATA BACKUPS

BACKGROUND

Data mining pertains to the processing of big data to obtain useful knowledge and insights. Further, data mining may entail manipulation of big data through a series of processing elements (or stages), which results in the generation of vast collections of temporary data. These collections of temporary data may yield through the application of various complex, time-consuming, and, often, resource-intensive data processing functions. Moreover, though these collections of temporary data may be stored in data lakes, such data lakes tend not participate in data backup operations.

DETAILED DESCRIPTION

Figure 1:
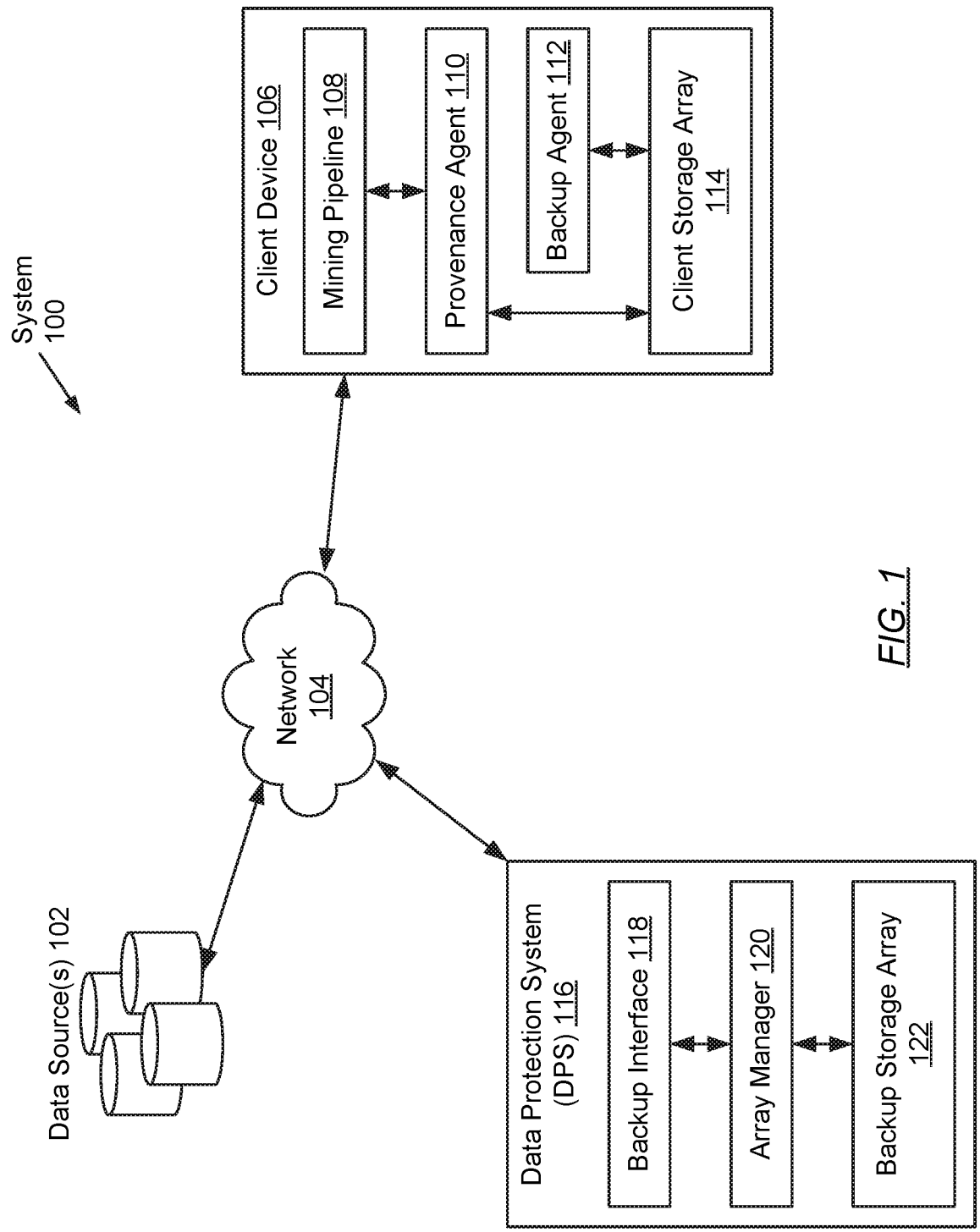
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for provenance-based data backups. Specifically, one or more embodiments of the invention entail generating and, subsequently, using data provenance to filter which collections of data, produced through the data mining of big data, should be replicated and consolidated in backup storage. Data provenance may refer to information (e.g., inputs, processes, etc.) that describes how any given dataset is produced. By way of an example, backup policies may be configured to automatically backup any given dataset, obtained through the aforementioned data mining process, should: a significant amount of time had elapsed to produce the given dataset; the given dataset can be reused in multiple workloads; the given dataset requires small storage capacity for consolidation; and a high resource cost may be associated with the production of the given dataset.

FIG. 1 shows a system in accordance with one or more embodiments of the invention. The system (100) may include a client device (106) operatively connected to one or more data sources (102) and a data protection system system (DPS) (116). Each of these components is described below.

In one embodiment of the invention, the various aforementioned system (100) components may be directly or indirectly connected to one another through a network (104) (e.g., a local area network (LAN), a wide area network (WAN) such as the Internet, a mobile network, etc.). The network (104) may be implemented using any combination of wired and/or wireless connections. Further, in embodiments in which any two or more system (100) components are indirectly connected, there may be other network-enabled components or systems (e.g., switches, routers, gateways, etc.) that may facilitate inter-communication between the system (100) components. Moreover, the various aforementioned system (100) components may communicate with one another using any combination of wired and/or wireless communication protocols.

In one embodiment of the invention, the client device (106) may represent any physical appliance or computing system designed and configured to receive, generate, process, store, and/or transmit data. Examples of the client device (106) may include, but are not limited to, a desktop computer, a tablet computer, a laptop computer, a server, a mainframe, or any other computing system similar to the exemplary computing system shown in FIG. 5. Furthermore, the client device (106) may include a mining pipeline (108), a provenance agent (110), a backup agent (112), and a client storage array (114). Each of these client device (106) sub-components is described below.

In one embodiment of the invention, the mining pipeline (108) may refer to a programmable framework for processing big data. Big data may refer to very large volumes of raw (or unprocessed) and, often, multivariate data. Examples of big data may include, but are not limited to, collections of data representative of: media (e.g., images, videos, audios, etc.), user information and preferences, financial transactions, public web (or Internet) information, sensor data, medical records, and any other collections of data, which may be produced and logged. Further, big data may be generated and/or aggregated at one or more data sources (102) (described below). Processing of big data, through the mining pipeline (108), may result in the acquisition of knowledge. Knowledge may refer to useful information (e.g., patterns, correlations, associations, trends, and other insights), which may be extracted from a collection of data (e.g., big data). Moreover, the mining pipeline (108) may be implemented as a hardware pipeline using physical elements (e.g., computer processors, memory, and other circuitry), a software pipeline using logical elements (e.g., processes, threads, routines, functions, etc.), or any combination thereof. The mining pipeline (108) is described in further detail with respect to FIG. 2.

Figure 3A:
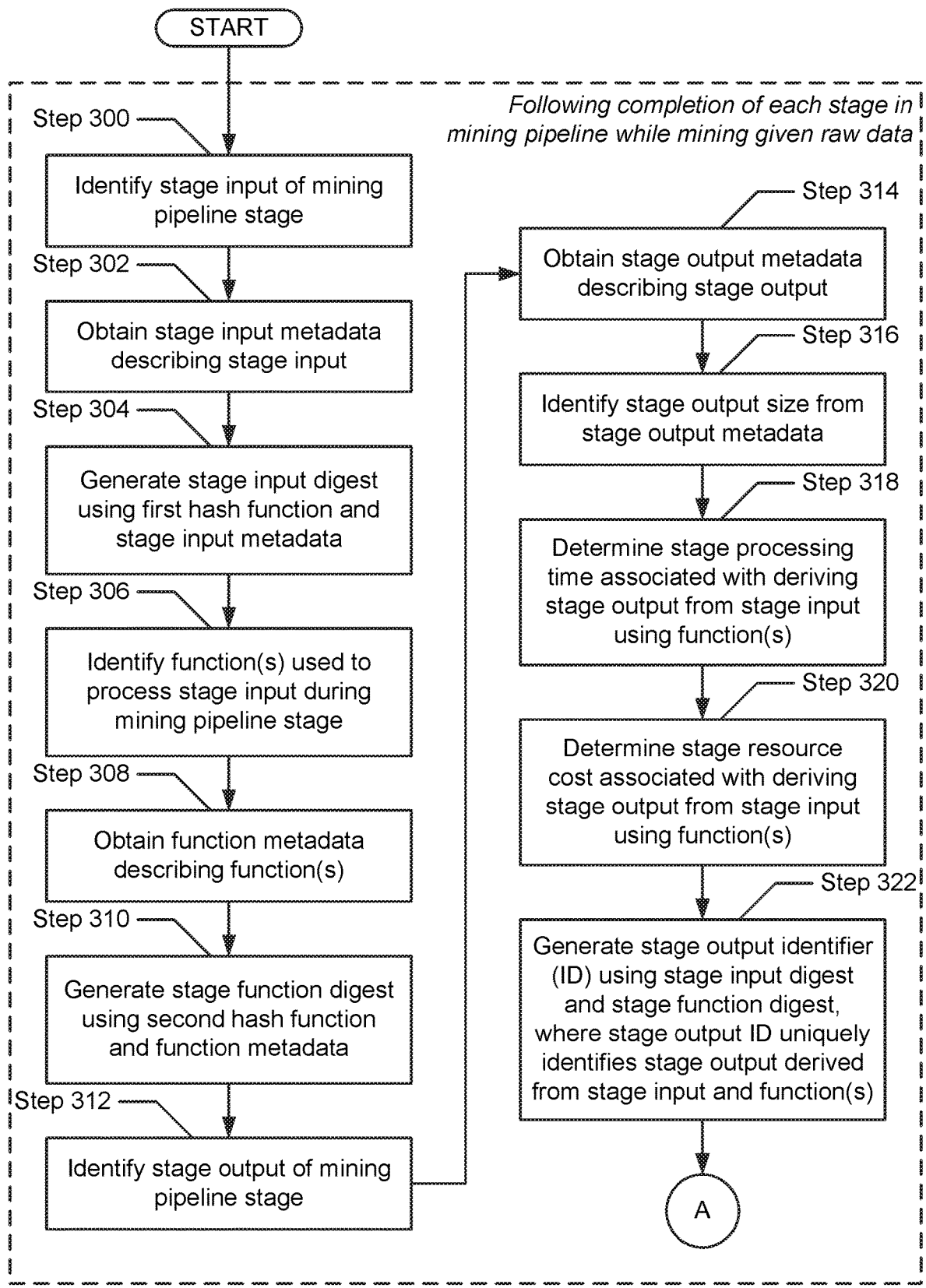
FIGS. 3A and 3B show flowcharts describing a method for generating stage output provenance in accordance with one or more embodiments of the invention.
Figure 3B:
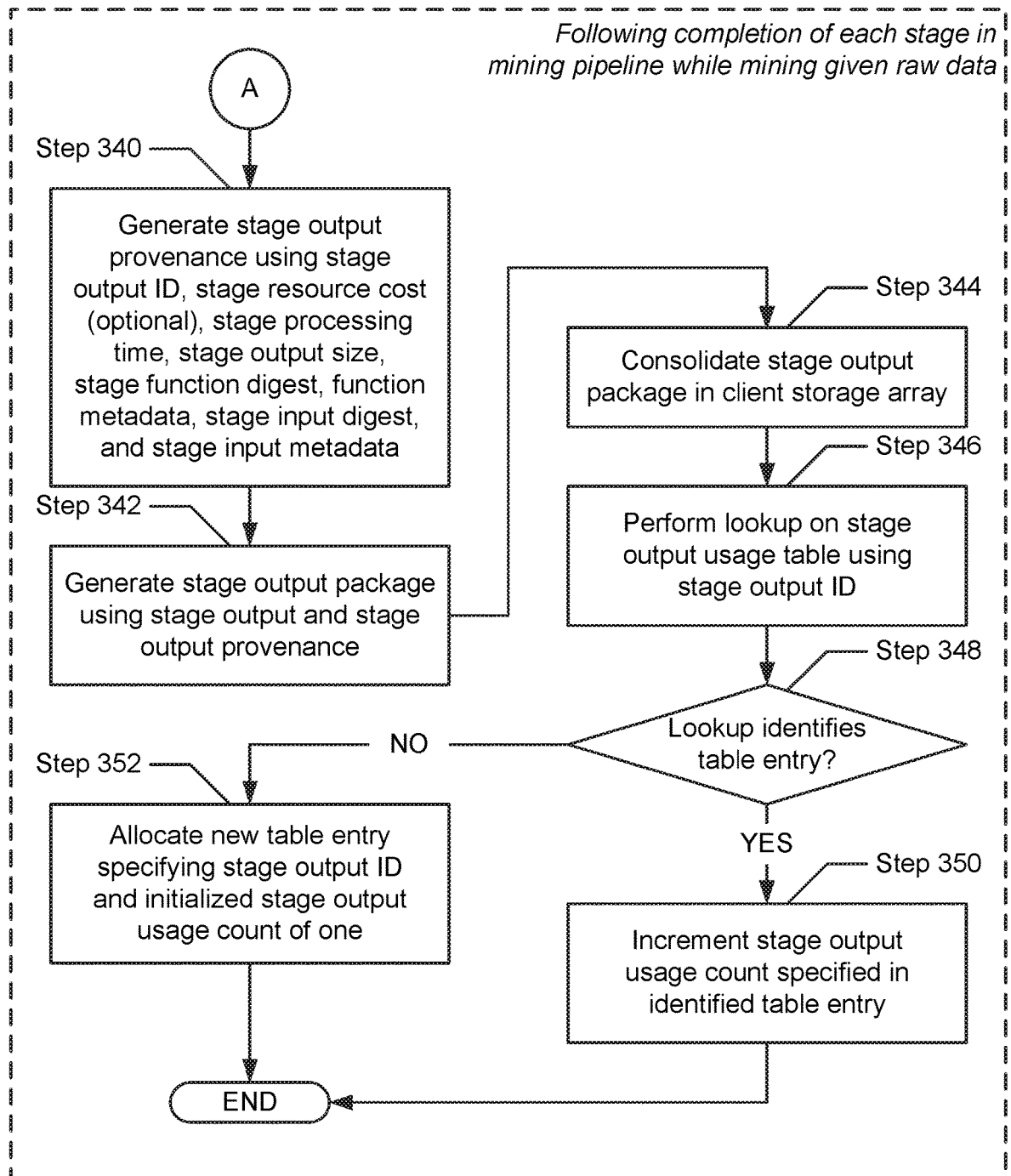

In one embodiment of the invention, the provenance agent (110) may refer to a computer program, which may execute on the underlying hardware of the client device (106), and may be designed and configured to generate data provenance. Data provenance may refer to information (e.g., inputs, processes, etc.) that describes how any given data has been produced. To that extent, the provenance agent (110) may generate data provenance in accordance with one or more embodiments of the invention, as shown in FIGS. 3A and 3B. One of ordinary skill will appreciate that the provenance agent (110) may perform other functionalities without departing from the scope of the invention.

Figure 4:
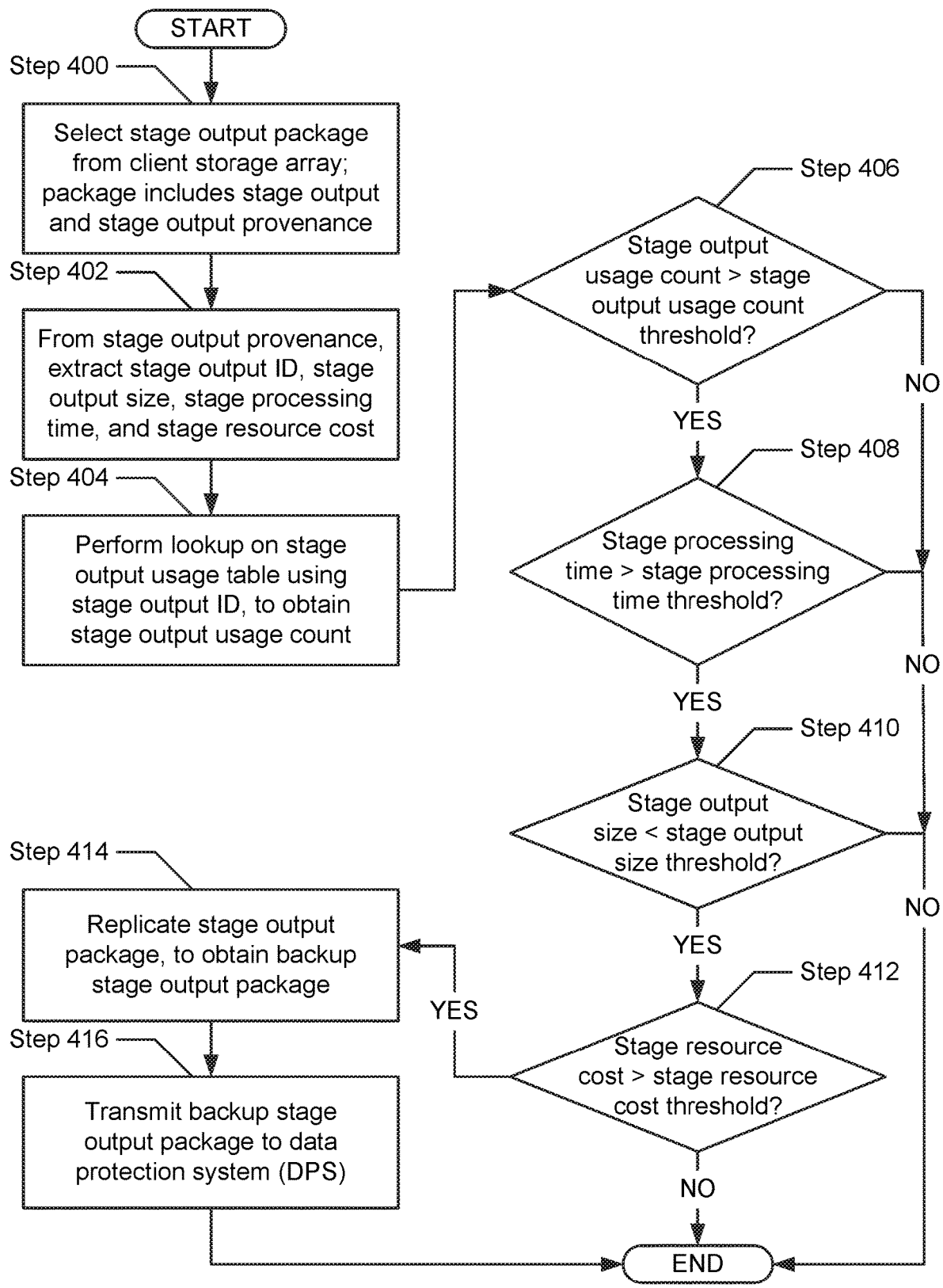
FIG. 4 shows a flowchart describing a method for backing up data in accordance with one or more embodiments of the invention.

In one embodiment of the invention, the backup agent (112) may refer to a computer program, which may execute on the underlying hardware of the client device (106), and may be designed and configured to manage data backup operations. To that extent, the backup agent (112) may back up data in accordance with one or more embodiments of the invention, as shown in FIG. 4. One of ordinary skill will appreciate that the backup agent (112) may perform other functionalities without departing from the scope of the invention.

In one embodiment of the invention, the client storage array (114) may refer to a collection of one or more physical storage devices (not shown) on which various forms of information may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the client storage array (114) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a data source (102) may represent a repository of big data (described above). A data source (102) may be implemented using one or more servers (not shown). Each server may be a physical server, which may reside in a datacenter, or a virtual server, which may reside in a cloud computing environment. Further, in one embodiment of the invention, a data source (102) may be implemented using one or more computing systems similar to the exemplary computing system shown in FIG. 5. Moreover, a data source (102) may include vast data storage capacity, wherein big data may be consolidated. The aforementioned data storage may be implemented using persistent (i.e., non-volatile) storage, examples of which include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Furthermore, examples of a data source (102) may include, but are not limited to, social media and interactive platforms, cloud computing platforms, the world wide web, Internet-of-things (IOT) networks, and databases.

In one embodiment of the invention, the DPS (116) may represent a data backup, archiving, and/or disaster recovery storage system. The DPS (116) may be implemented using one or more servers (not shown). Each server may be a physical server, which may reside in a datacenter, or a virtual server, which may reside in a cloud computing environment. Further, in one embodiment of the invention, the DPS (116) may be implemented using one or more computing systems similar to the exemplary computing system shown in FIG. 5. Moreover, the DPS (116) may include a backup interface (118), an array manager (120), and a backup storage array (122). Each of these DPS (116) subcomponents is described below.

In one embodiment of the invention, the backup interface (118) may refer to a set of subroutine definitions, protocols, and/or tools for enabling communications between the DPS (116) and other external entities (e.g., client device (106)). The backup interface (118) may be implemented using DPS (118) hardware, software executing thereon, or a combination thereof. Further, the backup interface (118) may include functionality to: receive, decode, and provide backup data (not shown) from one or more external entities, to the array manager (120); and, conversely, obtain, encode, and transmit backup data from the array manager (120), to one or more external entities. One of ordinary skill will appreciate that the backup interface (118) may perform other functionalities without departing from the scope of the invention. By way of an example, the backup interface (118) may be implemented as a web application programming interface (API), which may be accessed through an assigned web address (e.g., a uniform resource locator (URL)) and a WAN (e.g., Internet) connection.

In one embodiment of the invention, the array manager (120) may refer to refer to a computer program, which may execute on the underlying hardware of the DPS (116), and may be designed and configured to manage the backup storage array (122). To that extent, the array manager (120) may include functionality to: store backup data in the backup storage array (122); organize the consolidation of backup data, in the backup storage array (122), by way of any storage mechanism (e.g., tables, records, filesystems, etc.); and retrieve backup data from the backup storage array (122). One of ordinary skill will appreciate that the array manager (120) may perform other functionalities without departing from the scope of the invention.

In one embodiment of the invention, the backup storage array (122) may refer to a collection of one or more physical storage devices (not shown) on which various forms of information may be consolidated (or otherwise stored). Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the backup storage array (122) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 1 shows a configuration of components, other system (100) configurations may be used without departing from the scope of the invention.

Figure 2:
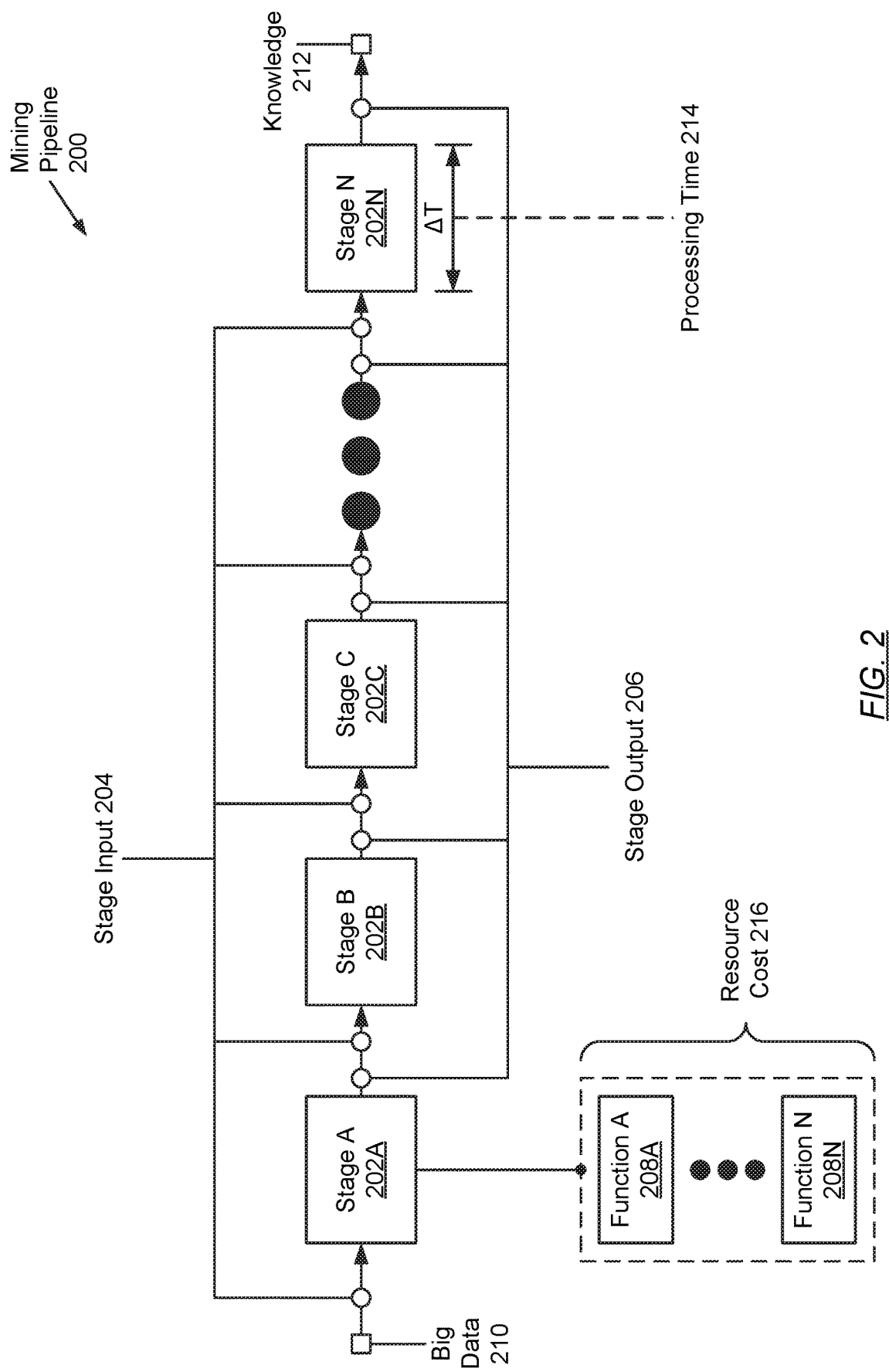
FIG. 2 shows a mining pipeline in accordance with one or more embodiments of the invention.

FIG. 2 shows a mining pipeline in accordance with one or more embodiments of the invention. The mining pipeline (200) may refer to a programmable framework for processing big data (210) (described above). Further, processing of big data (210), through the mining pipeline (200), may result in the acquisition of knowledge (212) (described above)—often albeit through the application of various complex, time-consuming, and resource-intensive processes.

In one embodiment of the invention, the mining pipeline (200) may be implemented using hardware and/or software elements, which may collectively take form as a chain of data processing stages (also referred herein as mining pipeline stages) (202A-202N). Accordingly, each stage (202A-202N) may process data based on their design and configuration. Specifically, each stage (202A-202N) may include functionality to: receive a stage input (204), representing the data for which the stage (202A-202N) is responsible for processing; processing the stage input (204) using one or more functions (208A-208N) (described below); and, as a result of processing the stage input (204), produce a stage output (206), representing processed (or refined) data. Furthermore, the stage output (206) of any given stage (202A-202N) may represent the stage input (204) for another stage (202A-202N), if any, that may immediately succeed the given stage (202A-202N). Moreover, the stage input (204) of the first stage (e.g., 202A) may encompass the raw big data (210), which may be retrieved from one or more data sources (not shown) (see e.g., FIG. 1), whereas the stage output (206) of the last stage (e.g., 202N) may refer to the above-mentioned sought knowledge (212), which may be extracted from the big data (210).

In one embodiment of the invention, a function (208A-208N), performed at a given stage (202A-202N), may represent an algorithm, a technique, a tool, a set of instructions, a logic, a circuit, a task, a decision, a lookup, or any other mechanism directed to, at least in part, producing the stage output (206) from the stage input (204) for the given stage (202A-202N). Collectively, the function(s) (208A-208N) of a given stage (202A-202N) may be directed to achieving a particular goal or objective for which the given stage (202A-202N) may be designed and configured. Examples of an aforementioned objective, sought by a stage (202A-202N), may include, but are not limited to, data integration (i.e., entailing the retrieval and aggregation of big data (210) from one or more data sources); data selection (i.e., entailing dimensionality reduction, which omits variables irrelevant to the overall mining pipeline (200) objective); data cleaning (i.e., entailing noise and/or inconsistent data elimination); data transformation (i.e., entailing the translation of big data (210) into mining appropriate forms and/or formats); data mining (i.e., entailing the execution of analyses on big data (210) to derive knowledge (212)); data validation (i.e., entailing the verification of any derived knowledge (212)); and data visualization (i.e., entailing the interpretation and presentation of any derived knowledge (212)).

In one embodiment of the invention, for each stage (202A-202N) of the mining pipeline (200), a respective processing start timestamp and a processing completed timestamp may be recorded. From these two aforementioned timestamps, a stage processing time (214) may be derived, which may reflect the length of time expended, by the function(s) (208A-208N), to produce the stage output (206) from data processing applied to the stage input (204) for the stage (202A-202N). Additionally, for each stage (202A-202N) of the mining pipeline (200), a respective stage resource cost (216) may be tracked. The stage resource cost (216) may reflect measurable quantities of one or more computing resources (e.g., processor cores, memory, storage, network bandwidth, etc.) consumed, by the function(s) (208A-208N), to produce the stage output (206) from data processing applied to the stage input (204) for the stage (202A-202N).

FIGS. 3A and 3B show flowcharts describing a method for generating stage output provenance in accordance with one or more embodiments of the invention. The various steps outlined below may be performed by the provenance agent executing on a client device (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

In one embodiment of the invention, the various steps outlined below may be performed following the completed processing of big data at each mining pipeline stage along the mining pipeline (see e.g., FIG. 2). Accordingly, turning to FIG. 3A, in Step 300, a stage input of the mining pipeline stage is identified. In one embodiment of the invention, the stage input may represent data that which the mining pipeline stage may be responsible for processing. Further, the stage input may encompass any raw (or unprocessed) collection of multivariate data retrieved from one or more data sources or, alternatively, may encompass processed data that may have been produced by a previous mining pipeline stage.

In Step 302, stage input metadata is obtained. In one embodiment of the invention, stage input metadata may refer to data or information that describes the stage input (identified in Step 300). The stage input metadata may be stored in, and thus obtained from, the same data container (e.g., file, archive format, etc.) that encapsulated the stage input. Furthermore, examples of stage input metadata may include, but are not limited to, an identifier (e.g., a data source identifier or a mining pipeline stage identifier) associated with the producer (e.g., data source or mining pipeline stage) of the stage input; a creation timestamp encoding the date and/or time on which the stage input had been produced; a stage input size indicating the storage capacity that may be consumed by the stage input; one or more keywords describing a context for the stage input; a file extension or data type associated with the stage input; a name assigned to the stage input; one or more variables expressed in the stage input; and any other properties or attributes associated with the stage input.

In Step 304, a stage input digest is generated. In one embodiment of the invention, the stage input digest may represent a deterministic, fixed-length character string that may be generated from the application of a hash function onto at least a portion of the stage input metadata (obtained in Step 302). More specifically, the stage input digest may pertain to information that uniquely identifies the stage input metadata. Further, a hash function may refer to a data association algorithm that maps a given input (e.g., stage input metadata) of any arbitrary length to a given output (e.g., stage input digest) from a range of possible, user-predefined outputs.

In Step 306, one or more functions of the mining pipeline stage is/are identified. In one embodiment of the invention, a function may refer to a hardware or software element that, at least in part, implements the data processing performed at the mining pipeline stage. Examples of a function may include, but are not limited to, an algorithm, a technique, a tool, a set of instructions, a logic, a circuit, a task, a decision, a lookup, or any other mechanism directed, at least in part, to implementing the aforementioned data processing at the mining pipeline stage.

In Step 308, function metadata is obtained. In one embodiment of the invention, function metadata may refer to data or information that describes the function(s) (identified in Step 306). The function metadata may be stored in, and thus obtained from, a metadata dedicated database whereon various metadata describing various elements (or components) may reside. Furthermore, examples of function metadata may include, but are not limited to, one or more stage input formats (i.e., stage input data types or file extensions) accepted by the function(s); one or more stage output formats (i.e., stage output data types or file extensions) produced by the function(s); one or more keywords collectively describing an objective of, or the particular data processing performed by, the function(s); a name assigned to the function(s); and any other properties or attributes associated with the function(s).

In Step 310, a stage function digest is generated. In one embodiment of the invention, the stage function digest may represent a deterministic, fixed-length character string that may be generated from the application of a hash function onto at least a portion of the function metadata (obtained in Step 308). More specifically, the stage function digest may pertain to information that uniquely identifies the function metadata. Further, a hash function may refer to a data association algorithm that maps a given input (e.g., function metadata) of any arbitrary length to a given output (e.g., stage function digest) from a range of possible, user-predefined outputs. Moreover, the hash function used to generate the stage function digest may be a same or different data association algorithm than the hash function used to generate the stage input digest (in Step 304).

In Step 312, a stage output of the mining pipeline stage is identified. In one embodiment of the invention, the stage output may represent data that which the mining pipeline stage may be tasked with producing. Further, the stage output may encompass processed data or, alternatively, the sought knowledge, produced or derived from the stage input (identified in Step 300) in conjunction with the data processing performed by the function(s) (identified in Step 306).

In Step 314, stage output metadata is obtained. In one embodiment of the invention, stage output metadata may refer to data or information that describes the stage output (identified in Step 312). The stage output metadata may be stored in, and thus obtained from, the same data container (e.g., file, archive format, etc.) that encapsulates the stage output. Furthermore, examples of stage output metadata may include, but are not limited to, an identifier (e.g., a mining pipeline stage identifier) associated with the producer (e g, mining pipeline stage) of the stage output; a creation timestamp encoding the date and/or time on which the stage output had been produced; a stage output size indicating the storage capacity that may be consumed by the stage output; one or more keywords describing a context for the stage output; a file extension or data type associated with the stage output; a name assigned to the stage output; one or more variables expressed in the stage output; and any other properties or attributes associated with the stage output.

In Step 316, from the stage output metadata (obtained in Step 314), a stage output size is identified and, subsequently, extracted. In one embodiment of the invention, as described above, the stage output size may represent a value or variable that indicates the storage capacity that may be consumed through storing of the stage output. By way of examples, the stage output size may be expressed in some factor of the units of data (i.e., bytes) (e.g., bytes, kilo-bytes, mega-bytes, giga-bytes, tera-bytes, peta-bytes, etc.).

In Step 318, a stage processing time for the mining pipeline stage is determined. In one embodiment of the invention, the stage processing time may reflect the length of time expended, by the function(s) (identified in Step 306), to produce the stage output (identified in Step 312) from data processing applied to the stage input (identified in Step 300). Further, the stage processing time may be determined from recorded processing start and complete timestamps (i.e., function metadata and/or stage output metadata) associated with this particular mining pipeline stage workload (described below).

In Step 320, a stage resource cost for the mining pipeline stage is determined. In one embodiment of the invention, the stage resource cost may reflect measurable quantities of one or more computing resources (e.g., processor cores, memory, storage, network bandwidth, etc.) consumed, by the function(s) (identified in Step 306), to produce the stage output (identified in Step 312) from data processing applied to the stage input (identified in Step 300). Further, the stage resource cost may be determined from recorded resource allocation information (e.g., tracked by a resource monitoring program) associated with this particular mining pipeline stage workload (described below).

In Step 322, a stage output identifier (ID) is generated. In one embodiment of the invention, the stage output ID may refer to a character string that uniquely identifies the stage output (identified in Step 312). In addition to uniquely identifying the stage output, the stage output ID may further uniquely identify the combination of the stage input (identified in Step 300) and the function(s) (identified in Step 306), which had implemented the data processing applied to the stage input. Accordingly, the stage output ID may be generated using at least the stage input digest (generated in Step 304) and the stage function digest (generated in Step 310).

Turning to FIG. 3B, in Step 340, a stage output provenance is generated. In one embodiment of the invention, the storage output provenance may refer to information (i.e., metadata) that describes and tracks how the stage output (identified in Step 312) had been produced. To that extent, information meeting this criteria, and used in the generation of the stage output provenance, may at least include the stage output ID (generated in Step 322), the stage resource cost (determined in Step 320), the stage processing time (determined in Step 318), and the stage output size (identified in Step 316). In one embodiment of the invention, the stage output provenance may further be generated using any subset or all of the following additional information: other stage output metadata (obtained in Step 314); the stage function digest (generated in Step 310); the function metadata (obtained in Step 308); the stage input digest (generated in Step 304); the stage input metadata (obtained in Step 302); the stage input (identified in Step 300); and any other information relevant to this particular mining pipeline stage workload (described below).

In Step 342, a stage output package is generated. In one embodiment of the invention, the stage output package may represent a data container that encapsulates (or includes)

information in a compressed, formatted form. By way of an example, the stage output package may manifest as any data archive format file (e.g., a ZIP archive file, a tarball or TAR archive file, a 7-ZIP or 7z archive file, etc.). Further, the stage output package may be generated using, and thus encapsulates, at least the stage output (identified in Step 312) and the stage output provenance (generated in Step 340).

In Step 344, the stage output package (generated in Step 342) is consolidated in a client storage array on the client device (see e.g., FIG. 1). Thereafter, in Step 346, a lookup is performed on a stage output usage table using the stage output ID (generated in Step 322). In one embodiment of the invention, the stage output usage table may represent a data structure, maintained in memory, that tracks the reusability of the unique combination of the stage input (identified in Step 300) and the function(s) (identified in Step 306), which had implemented the data processing applied to the stage input. Reusability of the aforementioned unique combination may refer to the number of times this unique combination had been reused, across multiple workloads. Further, each workload corresponds to a separate processing instance that entailed producing the stage output (identified in Step 312) based on the unique stage input and function(s) combination.

In Step 348, a determination is made as to whether the lookup (performed in Step 346) identified an existing table entry of the stage output usage table. Identification of an existing table entry may require that the existing table entry specifies (or includes) a stage output ID that matches the stage output ID (generated in Step 322), which had been used in the lookup. Accordingly, in one embodiment of the invention, if it is determined that the lookup identified an existing table entry of the stage output usage table, then the process may proceed to Step 350. On the other hand, in another embodiment of the invention, if it is alternatively determined that the lookup has not identified an existing table entry of the stage output usage table, then the process may alternatively proceed to Step 352.

In Step 350, after determining (in Step 348) that the lookup (performed in Step 356) has identified an existing table entry of the stage output usage table, a stage output usage count, further specified in the existing table entry, is identified. In one embodiment of the invention, the aforementioned stage output usage count may refer to a numerical value that records the number of workloads (described above) in which the stage output (identified in Step 312) had been reused. Subsequently, the stage output usage count may be incremented, thus reflecting the addition of this particular mining pipeline stage workload to the overall count of workloads in which the stage output had been reused.

In Step 352, after alternatively determining (in Step 348) that the lookup (performed in Step 356) had not identified an existing table entry of the stage output usage table, a new table entry is allocated. In one embodiment of the invention, the new table entry may subsequently specify (or include) the stage output ID (generated in Step 322) and an initial stage output usage count (i.e., a numerical value of one), which may reflect accounting this particular mining pipeline stage workload as the overall count of workloads in which the stage output had been reused.

FIG. 4 shows a flowchart describing a method for backing up data in accordance with one or more embodiments of the invention. The various steps outlined below may be performed by the backup agent executing on a client device (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, a stage output package is selected and, subsequently, retrieved from the client storage array on the client device (see e.g., FIG. 1). In one embodiment of the invention, the stage output package may represent a data container that encapsulates (or includes) a stage output and a stage output provenance. The stage output package and, accordingly, the stage output and the stage output provenance, may be associated with a mining pipeline stage of the mining pipeline (see e.g., FIG. 2). Specifically, the stage output may refer to processed (or refined) data produced by the mining pipeline stage, whereas the stage output provenance may refer to information (i.e., metadata) that describes and tracks how the stage output had been produced.

In Step 402, from the stage output provenance (included in the stage output package selected in Step 400), a stage output identifier (ID), a stage output size, a stage processing time, and a stage resource cost are extracted. In one embodiment of the invention, the stage output ID may refer to a character string that uniquely identifies the stage output (included in the stage output package selected in Step 400). Meanwhile, the stage output size may represent metadata that, at least in part, describes the stage output; and, more specifically, refers to a numerical value that indicates the amount of storage capacity that may be consumed by the stage output. Further, the stage processing time may refer to the recorded span of time that the function(s) (see e.g., FIG. 2), implementing the mining pipeline stage, took to produce the stage output. Moreover, the stage resource cost may refer to recorded quantities, respective to various computing resources (e.g., processor cores, memory, storage, network bandwidth, etc.), which may have been allocated and/or consumed by the aforementioned function(s) in order to produce the stage output.

In Step 404, a lookup is performed on a stage output usage table using the stage output ID (extracted in Step 402). In one embodiment of the invention, recall that the stage output ID may be generated using a stage input digest and a stage function digest. Accordingly, in addition to uniquely identifying the stage output (included in the stage output package selected in Step 400), the stage output ID further identifies the unique combination of a given stage input processed by a given set of functions, which produce the aforementioned stage output. Subsequently, the stage output usage table may represent a data structure, maintained in memory, that tracks the reusability of this unique combination of stage input and function(s), or the number of times this unique combination had been reused, across multiple workloads. Each workload corresponds to a separate processing instance that entailed producing the stage output based on the unique stage input and function(s) combination. Furthermore, based on the lookup performed on the stage output usage table, an existing table entry may be identified, which may specify the stage output ID (used to perform the lookup) and a stage output usage count. The stage output usage count may refer to a numerical value that records the number of workloads in which the stage output (i.e., resulting from the unique stage input and function(s) combination) had been reused.

In Step 406, a determination is made as to whether the stage output usage count (obtained in Step 404) exceeds a stage output usage count threshold. The stage output usage count threshold may refer to a single (or a range of) numerical value(s)—representative of a limit or condition—that must be met, for the process to continue onto a successive step in the method. Further, the stage output usage count threshold may be a programmable (i.e., dynamic) setting, which may be defined through user preferences. Accordingly, in one embodiment of the invention, if it is determined that the stage output usage count exceeds the stage output usage count threshold, then the process may proceed to Step 408. On the other hand, in another embodiment of the invention, if it is alternatively determined that the stage output usage count does not meet the stage output usage count threshold, then the process ends.

In Step 408, after determining (in Step 406) that the stage output usage count (obtained in Step 404) exceeds the stage output usage count threshold, a determination is made as to whether the stage processing time (extracted in Step 402) exceeds a stage processing time threshold. The stage processing time threshold may refer to a single (or a range of) numerical value(s)—representative of a limit or condition—that must be met, for the process to continue onto a successive step in the method. Further, the stage processing time threshold may be a programmable (i.e., dynamic) setting, which may be defined through user preferences. Accordingly, in one embodiment of the invention, if it is determined that the stage processing time exceeds the stage processing time threshold, then the process may proceed to Step 410. On the other hand, in another embodiment of the invention, if it is alternatively determined that the stage processing time does not meet the stage processing time threshold, then the process ends.

In Step 410, after determining (in Step 408) that the stage processing time (extracted in Step 402) exceeds the stage processing time threshold, a determination is made as to whether the stage output size (also extracted in Step 402) falls below a stage output size threshold. The stage output size threshold may refer to a single (or a range of) numerical value(s)—representative of a limit or condition—that must be met, for the process to continue onto a successive step in the method. Further, the stage output size threshold may be a programmable (i.e., dynamic) setting, which may be defined through user preferences. Accordingly, in one embodiment of the invention, if it is determined that the stage output size falls below the stage output size threshold, then the process may proceed to Step 412. On the other hand, in another embodiment of the invention, if it is alternatively determined that the stage output size matches or exceeds the stage output size threshold, then the process ends.

In Step 412, after determining (in Step 410) that the stage output time (extracted in Step 402) falls below the stage output size threshold, a determination is made as to whether the stage resource cost (also extracted in Step 402) exceeds a stage resource cost threshold. The stage resource cost threshold may refer to a single (or a range of) numerical value(s)—representative of a limit or condition—that must be met, for the process to continue onto a successive step in the method. Further, the stage resource cost threshold may be a programmable (i.e., dynamic) setting, which may be defined through user preferences. Accordingly, in one embodiment of the invention, if it is determined that the stage resource cost exceeds the stage resource cost threshold, then the process may proceed to Step 414. On the other hand, in another embodiment of the invention, if it is alternatively determined that the stage resource cost does not meet the stage resource cost threshold, then the process ends.

In Step 414, after determining (in Step 412) that the state resource cost (extracted in Step 402) exceeds the stage resource cost threshold, the stage output package (selected in Step 400) is replicated. In one embodiment of the invention, through replication of the stage output package, a backup stage output package may be obtained. Thereafter, in Step 416, the backup stage output package (obtained in Step 414) is transmitted to the data protection system (DPS) for consolidation.

Figure 5:
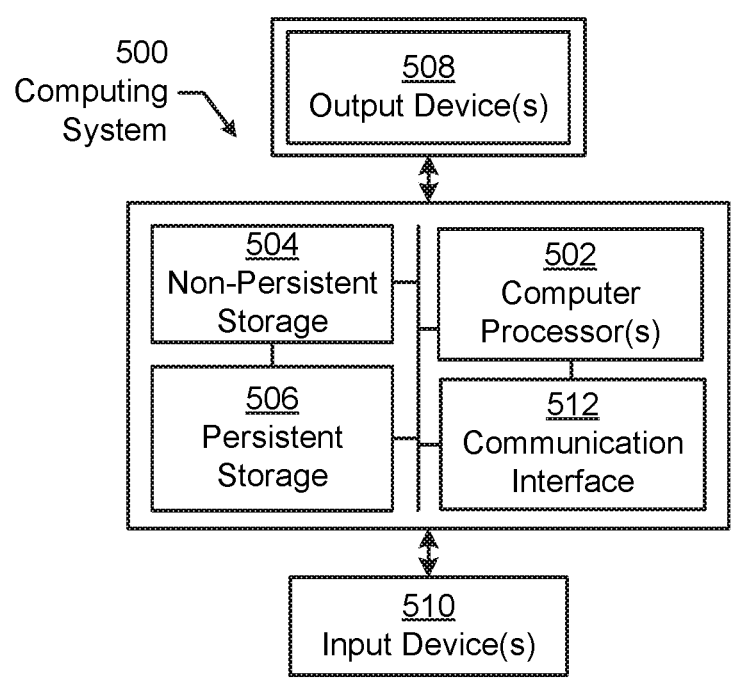
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for consolidating data, comprising:
prior to selecting a stage output package and following a completion of a mining pipeline stage of a mining pipeline:

generating a stage output identifier (ID) using a stage input digest and a stage function digest;
performing a first lookup on a stage output usage table using the stage output ID;
making a determination, based on the first lookup, that the stage output usage table comprises the stage output ID;
identifying, based on the determination, an existing table entry of the stage output usage table, wherein the existing table entry comprises the stage output ID and a first stage output usage count;
incrementing the first stage output usage count, to obtain a second stage output usage count;
selecting a stage output package comprising a stage output and a stage output provenance;
extracting, from the stage output provenance, at least the stage output ID, a stage processing time, and a stage output size;
performing a second lookup on the stage output usage table using the stage output ID, to obtain the second stage output usage count;
based at least on the second stage output usage count, the stage processing time, and the stage output size:
replicating the stage output, to obtain a backup stage output; and
storing the backup stage output in a data protection system.

2. The method of claim 1, wherein replicating the stage output based at least on the second stage output usage count, the stage processing time, and the stage output size, comprises:
making a second determination that the second stage output usage count exceeds a stage output usage count threshold;
making a third determination that the stage processing time exceeds a stage processing time threshold; and
making a fourth determination that the stage output size falls short of a stage output size threshold.

3. The method of claim 2, further comprising:
from the stage output provenance, further extracting a stage resource cost,
wherein replicating the stage output is further based on the stage resource cost, and further comprises:
making a fifth determination that the stage resource cost exceeds a stage resource cost threshold.

4. The method of claim 1, further comprising:
prior to generating the stage output ID:
identifying a stage input of the mining pipeline stage;
obtaining stage input metadata describing the stage input; and
generating the stage input digest using a first hash function and the stage input metadata.

5. The method of claim 4, further comprising:
identifying at least one function implementing the mining pipeline stage, wherein the at least one function produces the stage output from the stage input;
obtaining function metadata describing the at least one function; and
generating the stage function digest using a second hash function and the function metadata.

6. A system, comprising:
a storage array and a backup storage array;
a computer processor operatively connected to the storage array and the backup storage array;
a provenance agent executing on the computer processor, and programmed to:
prior to select a stage output package and following a completion of a mining pipeline stage of a mining pipeline:
generate a stage output identifier (ID) using a stage input digest and a stage function digest;
perform a first lookup on a stage output usage table using the stage output ID;
make a determination, based on the first lookup, that the stage output usage table comprises the stage output ID;
identify, based on the determination, an existing table entry of the stage output usage table, wherein the existing table entry comprises the stage output ID and a first stage output usage count;
increment the first stage output usage count, to obtain a second stage output usage count; and
a backup agent executing on the computer processor, and programmed to:
select, from the storage array, a stage output package comprising a stage output and a stage output provenance;
extract, from the stage output provenance, at least the stage output ID, a stage processing time, and a stage output size;
perform a second lookup on the stage output usage table using the stage output ID, to obtain the second stage output usage count;
based at least on the second stage output usage count, the stage processing time, and the stage output size:
replicate the stage output, to obtain a backup stage output; and
store the backup stage output in the backup storage array.

7. The system of claim 6, further comprising:
a mining pipeline implemented, at least in part, by the computer processor, and comprising a plurality of mining pipeline stages,
wherein the plurality of mining pipeline stages is serially linked to form a mining pipeline stage chain.

8. The system of claim 7, further comprising:
a client device, comprising:
the computer processor, the storage array, the provenance agent, and the backup agent; and
a mining pipeline implemented at least by the computer processor, and representing a framework for processing big data.

9. The system of claim 8, further comprising:
a data protection system (DPS) comprising the backup storage array, and operatively connected to the client device.

10. A non-transitory computer readable medium (CRM) comprising computer readable program code, which when executed by a computer processor, enables the computer processor to:
prior to select a stage output package and following a completion of a mining pipeline stage of a mining pipeline:
generating a stage output identifier (ID) using a stage input digest and a stage function digest;
performing a first lookup on a stage output usage table using the stage output ID;
making a determination, based on the first lookup, that the stage output usage table comprises the stage output ID;
identifying, based on the determination, an existing table entry of the stage output usage table, wherein the existing table entry comprises the stage output ID and a first stage output usage count;

incrementing the first stage output usage count, to obtain a second stage output usage count;

select a stage output package comprising a stage output and a stage output provenance;

extract, from the stage output provenance, at least the stage output ID, a stage processing time, and a stage output size;

perform a second lookup on the stage output usage table using the stage output ID, to obtain the second stage output usage count;

based at least on the second stage output usage count, the stage processing time, and the stage output size:

replicate the stage output, to obtain a backup stage output; and store the backup stage output in a data protection system.

11. The non-transitory CRM of claim 10, further comprising computer readable program code, which when executed by the computer processor, enables the computer processor to:

make a second determination that the second stage output usage count exceeds a stage output usage count threshold;

make a third determination that the second stage processing time exceeds a stage processing time threshold; and make a fourth determination that the stage output size falls short of a stage output size threshold, wherein the stage output is replicated, to obtain the backup stage output, based on the second, third and fourth determinations.

12. The non-transitory CRM of claim 11, further comprising computer readable program code, which when executed by the computer processor, enables the computer processor to:

from the stage output provenance, further extract a stage resource cost, wherein replication of the stage output is further based on the stage resource cost, and further enables the computer processor to:

make a fifth determination that the stage resource cost exceeds a stage resource cost threshold.

13. The non-transitory CRM of claim 5, further comprising computer readable program code, which when executed by the computer processor, enables the computer processor to:

prior to generation of the stage output ID:

identify a stage input of the mining pipeline stage;

obtain stage input metadata describing the stage input; and generate the stage input digest using a first hash function and the stage input metadata.

14. The non-transitory CRM of claim 13, further comprising computer readable program code, which when executed by the computer processor, enables the computer processor to:

identify at least one function implementing the mining pipeline stage, wherein the at least one function produces the stage output from the stage input;

obtain function metadata describing the at least one function; and generate the stage function digest using a second hash function and the function metadata.

* * * * *

UNITED STATES PATENT AND TRADEMARK OFFICE
CERTIFICATE OF CORRECTION

| | |
|---|---|
| PATENT NO. | : 11,301,418 B2 |
| APPLICATION NO. | : 16/402196 |
| DATED | : April 12, 2022 |
| INVENTOR(S) | : Assaf Natanzon, David Zlotnick and Boris Shpilyuck |

It is certified that error appears in the above-identified patent and that said Letters Patent is hereby corrected as shown below:

In the Claims

Claim 13, Column 16, Line 12, the words "claim 5" should read -- claim 10 --.

Signed and Sealed this
Thirtieth Day of August, 2022

Katherine Kelly Vidal
*Director of the United States Patent and Trademark Office*